(12) United States Patent
Pickett

(10) Patent No.: US 8,300,773 B2
(45) Date of Patent: Oct. 30, 2012

(54) TELEPHONIC RECORDING SYSTEM AND METHOD

(75) Inventor: Seth Pickett, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1583 days.

(21) Appl. No.: 11/799,379

(22) Filed: Apr. 30, 2007

(65) Prior Publication Data

US 2008/0267363 A1    Oct. 30, 2008

(51) Int. Cl.
*H04M 1/64* (2006.01)

(52) U.S. Cl. .................. 379/85; 379/32.03; 379/202.01; 455/412; 455/556; 348/14.09

(58) Field of Classification Search .................. 379/67.1, 379/67, 32.03, 202.01; 455/412, 556; 348/14.09
See application file for complete search history.

(56) References Cited

U.S. PATENT DOCUMENTS

| 4,941,166 | A | * | 7/1990 | Waldman et al. | 379/67.1 |
| 5,544,231 | A | * | 8/1996 | Cho | 379/88.24 |
| 5,867,793 | A | | 2/1999 | Davis | |
| 5,995,824 | A | * | 11/1999 | Whitfield | 455/412.1 |
| 6,163,508 | A | | 12/2000 | Kim et al. | |
| 6,243,594 | B1 | * | 6/2001 | Silberfenig | 455/556.1 |
| 6,771,768 | B2 | | 8/2004 | Dietz et al. | |
| 6,792,093 | B2 | * | 9/2004 | Barak et al. | 379/202.01 |
| 7,164,934 | B2 | | 1/2007 | Malizia-Hoyt et al. | |
| 2004/0207724 | A1 | * | 10/2004 | Crouch et al. | 348/14.09 |
| 2005/0113113 | A1 | | 5/2005 | Reed | |
| 2006/0146990 | A1 | * | 7/2006 | Wagner et al. | 379/67.1 |
| 2006/0233316 | A1 | * | 10/2006 | Doskow et al. | 379/32.03 |

* cited by examiner

*Primary Examiner* — Fan Tsang
*Assistant Examiner* — Van D Huynh

(57) ABSTRACT

A telephonic recording method comprises recording, by an electronic device, a live conversation with at least one participant to form a recorded live conversation. The telephonic recording method further comprises presenting a portion of the recorded live conversation beginning at a segment selected by a user while continuing to record the live conversation.

17 Claims, 2 Drawing Sheets

TELEPHONIC RECORDING SYSTEM AND METHOD

BACKGROUND

Sometimes, users engaged in a telephone conversation miss a piece of the conversation because the user is distracted. Thus, users must interrupt the conversation and ask the speaker to repeat the missed portion of the conversation.

BRIEF DESCRIPTION OF THE DRAWINGS

FIG. 3 is a flow chart illustrating an embodiment of a method for reviewing a telephonic recording.

DETAILED DESCRIPTION OF THE DRAWINGS

Figure 1:
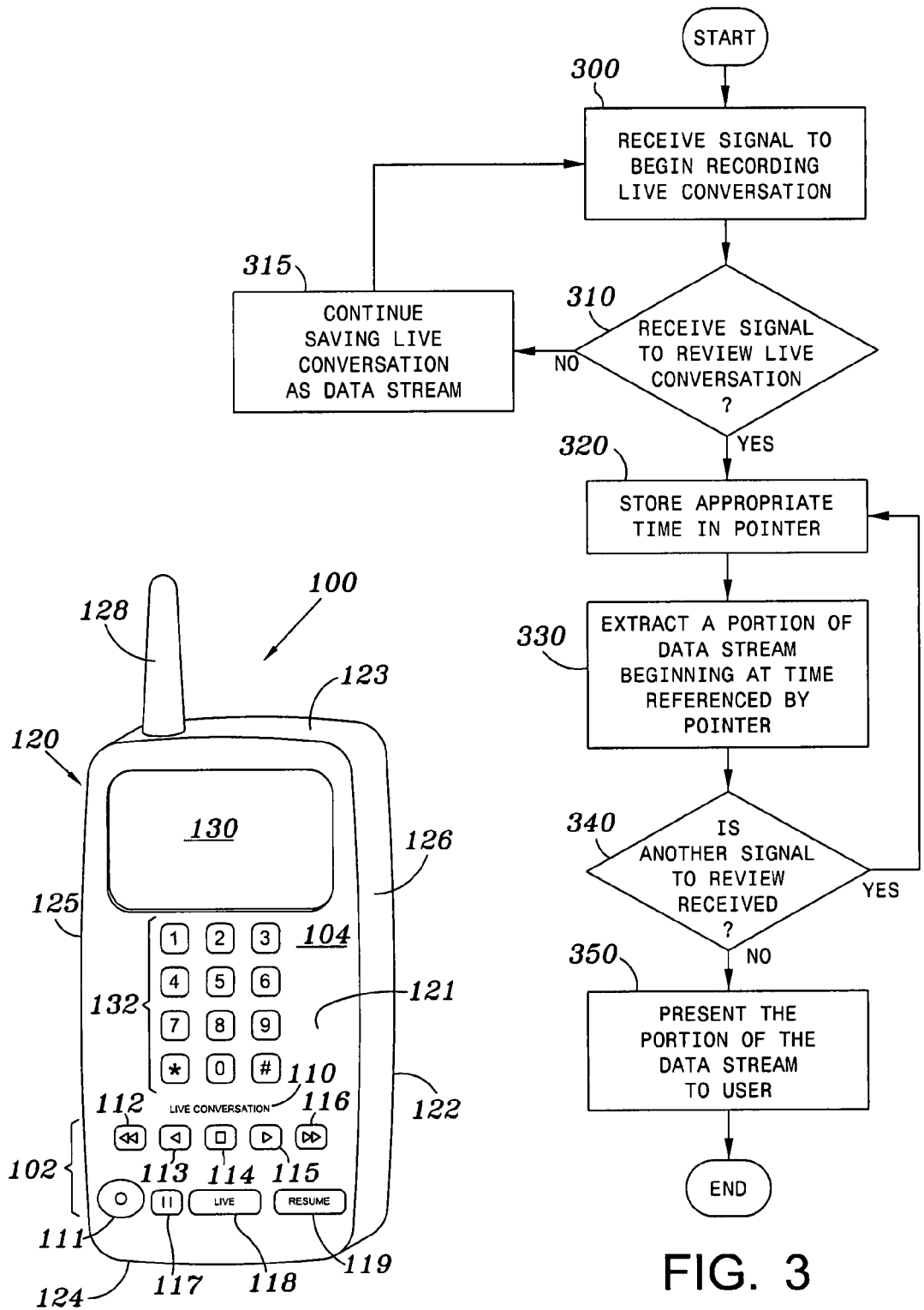
FIG. 1 illustrates an electronic device in which an embodiment of a telephonic recording system is employed to advantage.

FIG. 1 illustrates an electronic device 100 in which an embodiment of a telephonic recording system 102 is implemented. In the illustrative embodiment, electronic device 100 is a cellular telephone 104. However, it should be noted that electronic device 100 can be any device configured to conduct a verbal conversation between one or more individuals, such as, but not limited to, any type of telephone, a personal digital assistant (PDA), desktop computer, and a laptop computer.

Electronic device 100 comprises a housing 120 which comprises at least a portion of the electronic components for electronic device 100. Housing 120 comprises a front member 121, a back member 122, a top member 123, a bottom member 124, and side members 125 and 126. In the illustrative embodiment, an antenna 128 for providing wireless communications is coupled to top member 123.

Front member 121 comprises a display unit 130 and a number pad 132. In the embodiment illustrated in FIG. 1, telephonic recording system 102 comprises a live conversation review interface 110 disposed on front member 121. However, it should be understood that live conversation review interface 110 can be disposed along any surface and/or edge of housing 120. Furthermore, it should noted that live conversation review interface 110 can be configured onto a separate device, such as a remote control or a key fob. In this embodiment, the separate device can be a wired or wireless device configured to interact with electronic device 100. Moreover, live conversation review interface 110 can also be embodied as touch screen on display unit 130. Thus, in this embodiment, each button and/or function on live conversation review interface 110 is represented as a graphical user interface (GUI) icon on display unit 130. Furthermore, in an alternative embodiment, live conversation review interface 110 can be integrated into keypad 132 such that a single or series of keys during a conversation initiates live conversation review interface 110. Alternatively, in this embodiment, another button (e.g. a function or shift key button) can be employed so that each button on keypad 132 can also be used for live conversation review interface 110.

Live conversation review interface 110 enables a user to review a recorded portion of a live conversation while continuing to record the on-going live conversation. A live conversation is a conversation in which a user is presently conducting and engaging with at least one other individual or entity. The live conversation can be a verbal conversation, a video conference, a simultaneous verbal and textual conversation, or any combination thereof. In the illustrative embodiment, live conversation review interface 110 comprises a record button 111, a skip back button 112, a rewind button 113, a stop button 114, a play button 115, a fast forward button 116, a pause button 117, a live button 118, and a resume button 119.

Live conversation review interface 110 enables a user to review any recorded portion of a live conversation. A portion is any segment or part of the live conversation. The portion can be one or more continuous segments of the live conversation, including the entire live conversation. Record button 111 enables a user to begin and end the recording of a live conversation. In some embodiments, in response to the user selecting record button 111 to begin recording the live conversation, electronic device 100 notifies the other participants on the call that the live conversation is being recorded. The notification can be, for example, an automated voice notification, a notification by a live operator, a single or series of audible tones, or a notice presented on a video screen. In alternative embodiments, no notification is given to the other participants when record button 111 is selected.

A user can designate which portions of the recorded live conversation to review by hitting skip back button 112, rewind button 113, or fast forward button 116. Skip back button 112 enables a user to quickly rewind to a particular recorded portion of the live conversation. In one embodiment, skip back button 112 rewinds in time blocks, for instance, in five or ten second time blocks. Thus, when a user selects skip back button 112, electronic device 100 jumps to the time block immediately preceding the instance when the user selected the skip back button 112. If the user selects skip back button 112 a second time, electronic device 110 jumps back to the time block immediately preceding the previously selected time block. In another embodiment, skip back button 112 continuously rewinds or searches the live conversation at a rate quicker than rewind button 113.

Rewind button 113 searches the recorded live conversation based on the amount of time the user selects rewind button 113. Telephonic recording system 102 begins playing the recorded live conversation once rewind button 113 is unselected. Fast forward button 116 searches forward from the time when the user selects fast forward button 116. Fast forward button 116 forwards the user to another portion of the recorded live conversation. In the embodiment illustrated, fast forward button 116 in the same manner as skip back button 112 in response to a user selecting fast forward button 116 a second time. Thus, selecting fast forward button 116 a second time results in electronic device 100 skipping to a time block in the recorded live conversation which is immediately subsequent to the instance when the user selected fast forward button 116.

As a user is reviewing the recording of the live conversation, telephonic recording system 102 continues to simultaneously record the on-going live conversation. Thus, live button 118 enables a user to return to the live conversation at any time when the user is finished reviewing the recording. Live button 118 stops any portion of the recorded live conversation and returns the user to the on-going live conversation. In the embodiment illustrated, the user can select resume button 119 to continue reviewing the recorded portion of the live conversation from the point in which electronic device 100 last stopped. In an alternative embodiment, resume button 119 may be omitted, and a user can use skip back button 112 and rewind button 113 to identify the segment to begin reviewing.

Figure 2:
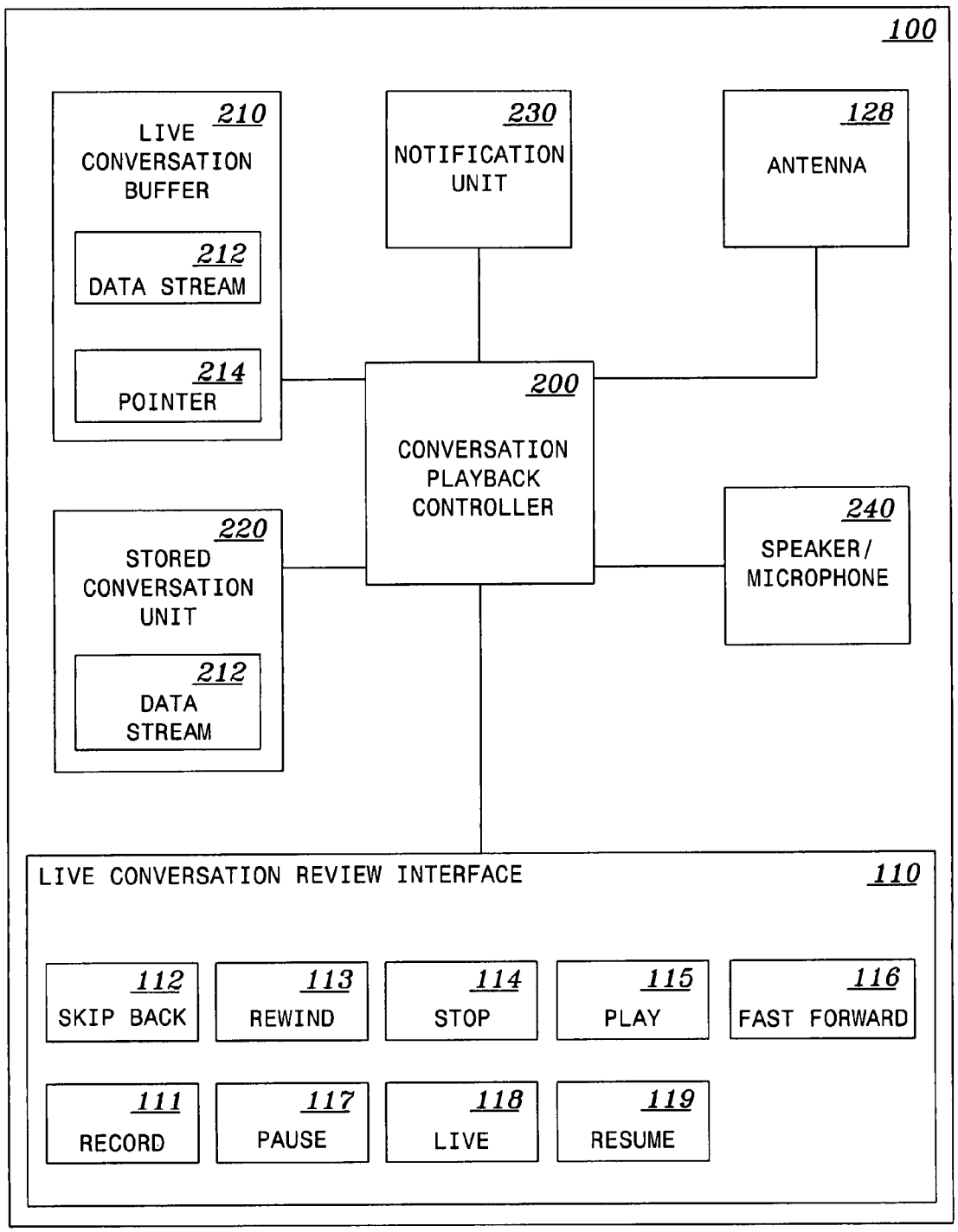
FIG. 2 is a block diagram of an electronic device in which an embodiment of a telephonic recording system is implemented.

FIG. 2 is a block diagram of electronic device 100 in which an embodiment of telephonic recording system 102 is implemented. Telephonic recording system 102 is a hardware and software combined embodiment. In alternative embodiments, telephonic recording system 102 may be a hardware-only or a software-only embodiment.

In the illustrative embodiment, telephonic recording system 102 comprises a conversation playback controller 200, a live conversation buffer 210, a stored conversation unit 220, a notification unit 230, a speaker/microphone 240, and live conversation review feature 110. Conversation playback controller 200 is a processing unit and/or otherwise comprises a processor which executes and/or otherwise processes the instructions for reviewing a recorded live conversation. In the illustrative embodiment, a user initiates a single or series of commands for reviewing the recorded live conversation using live conversation review feature 110.

In the illustrative embodiment, conversation playback controller 200 begins recording a live conversation in response to the user selecting record button 111. In an alternative embodiment, conversation playback controller 200 can automatically begin recording a live conversation when the user begins or receives a call. In this embodiment, conversation playback controller 200 begins recording when conversation playback controller 200 detects either a dial tone signal or an interrupt signal indicating that the user is answering a call.

The live conversation is stored in live conversation buffer 210. Live conversation buffer 210 is a storage element (e.g. flash memory) which saves a live conversation data signal in the form of a data stream 212. Data stream 212 can be a stream of audio, video, and/or textual data. In some embodiments, live conversation buffer 210 is a rolling buffer or a buffer which saves a specific amount of data beginning with the current time backwards to a specified time period. In this embodiment, once the live conversation passes the specified time, the conversation playback controller 200 writes over or records over the beginning of data stream 212. Thus, in this embodiment, data stream 212 is a consistent amount of time of recorded live conversation. However, it should be understood that telephonic recording system 102 may be otherwise configured.

In some embodiments, live conversation buffer 210 is persistent storage and saves the entire live conversation. Once the conversation is completed, live conversation buffer 210 can store the live conversation or conversation playback controller 200 can automatically move data stream 212 from live conversation buffer 210 to stored conversation unit 220. Stored conversation unit 220 is a non-volatile, storage element (e.g. hard disk drive, an optical drive, or flash memory) which stores data stream 212 for a period longer than live conversation buffer 210. It is noted, however, that stored conversation unit 220 can store a plurality of data streams similar to data stream 212.

In yet another embodiment, the user can instruct conversation playback controller 200 to save data stream 212, and in response to the command, conversation playback controller 200 can then move data stream 212 from live conversation buffer 210 to stored conversation unit 200. The user can then subsequently designate data stream 212 to be deleted from stored conversation unit 220.

In the illustrative embodiment, notification unit 230 alerts other participants in a live conversation that the current conversation is being recorded. In one embodiment, notification unit 230 can be a recorded voice which plays in response to a user selecting record button 111. Alternatively, notification unit 230 can be a series of audible tones or sounds which are initiated in response to a user selecting record button 111. The series can be one or more audible tones or sounds. In yet another embodiment, notification unit 230 includes an antenna and transmits a signal to an operator. The operator can then interrupt the live conversation and notify the participants that the conversation is being recorded.

Thus, in use, conversation playback controller 200 receives a signal to begin recording a live conversation. The signal can be (1) a signal indicating that record button 111 has been selected or (2) a signal to automatically record the live conversation initiated by a dial tone or an answered call signal. In response to receiving the signal, conversation playback controller 200 notifies at least one participant in the live conversation that the live conversation is being recorded. The notification is one of an audible series of tones, a recorded message, or a live operator presenting the notification.

Conversation playback controller 200 then begins recording the live conversation being conducted on electronic device 100. The live conversation is stored in live conversation buffer 210 as data stream 212. If conversation playback controller 200 receives a signal indicating that either skip back button 112 or rewind button 113 is selected, conversation playback controller 200 stores a pointer 214 in live conversation buffer 210. Pointer 214 is a data element which identifies or points to a value at a particular memory address location in data stream 212. Specifically, in the embodiment illustrated, pointer 214 points to the time in data stream 212 when skip back button 112 or rewind button 113 signal is received.

If skip back button 112 signal is received, conversation playback controller 200 reads the time to which pointer 214 points and identifies a beginning time in data stream 212 to which conversation playback controller 200 should skip. Conversation playback controller 200 then skips back to the beginning time and saves the memory address location for the time skipped back to in pointer 214. Thus, if conversation playback controller 200 receives a second skip back button 112 signal, then conversation playback controller 200 writes over the data stored in pointer 214 and references the new time recorded in pointer 214 from which to skip back. However, it should be noted that, in alternative embodiments, telephonic recording system 102 may be implemented using a plurality of pointers similar to pointer 214.

If conversation playback controller 200 receives rewind button 113 signal, then pointer 214 dynamically moves backwards as the user searches data stream 212. In other words, the memory address location saved in pointer 214 dynamically changes with the amount of time the user selects rewind button 113. Similarly, pointer 214 dynamically changes forward in time when fast forward button 116 is selected. In response to fast forward button 116 being selected a second time, pointer 214 also skips forward in a similar manner as when skip back button 112 is selected.

In response to conversation playback controller 200 receiving either (1) a select signal from play button 115 or (2) an unselect signal from skip back button 112, rewind button 113, or fast forward button 116, conversation playback controller 200 extracts the recorded portions of the live conversation from data stream 212. Conversation playback controller 200 then transmits the portion of data stream 212 to speaker/microphone 240 which presents the portion of data stream 212 to the user.

As the recorded portions of the data stream 212 is being presented, conversation playback controller 200 simultaneously records the on-going live conversation. Thus, conversation playback controller 200 continues to receive data stream 212 from antenna 128. Thus, as conversation playback controller 200 receives data stream 212, conversation playback controller 200 adds the new data to the end of data stream 212 in user conversation buffer 210.

In some embodiments, conversation playback controller 200 automatically transfers data stream 212 to stored conversation unit 220 at the end of the live conversation session. However, if the live conversation session ends before the user finishes reviewing data stream 212, then conversation playback controller 200 transfers data stream 212 to stored conversation unit 220 after the user finishes reviewing data stream 212 or when stop button 114 is selected, whichever occurs first. If the user wishes to continue reviewing data stream 212 after selecting stop button 114, conversation playback controller 200 extracts data stream 212 from stored conversation unit 220 and then presents data stream 212 to the user. A user can instruct conversation player controller 200 to delete data stream 212 or data stream 212 can automatically be deleted after a default time period. In alternative embodiments, however, stored conversion unit 220, may be omitted, and data stream 212 may continually persist in live conversation buffer 210 until data stream 212 is designated to be deleted.

If the user selects live button 118, then conversation playback controller 200 stores in pointer 214 the time in data stream 212 in which the user stopped reviewing data stream 212. Conversation playback controller 200 then refers to the time stored in pointer 214 to determine which portion of data stream 212 to extract if the user selects resume button 119 at a later time. The data stored in pointer 214 remains until the data in pointer 214 changes when the user selects to review data stream 212 or when resume button 119 is later selected.

FIG. 3 is a flow chart illustrating an embodiment of a telephonic recording method. The method begins at block 300 with electronic device 100 receiving a signal to begin recording a live conversation. The recording can begin automatically at the beginning of the live conversation or when a user selects record button 111. Electronic device 100 then determines whether a signal to review the live conversation is received (block 310). The review signal is indicated by the selection of either skip back button 112 or rewind button 113.

If a receive signal is not received ("no" output to block 310), electronic device 100 then continues saving the live conversation in the form of data stream 212 (block 315), with the method repeating beginning with block 310. If, however, the review signal is received ("yes" output to block 310), then electronic device 100 stores the appropriate time in pointer 214 (block 320) and then extracts a portion of data stream 212 beginning at the time referenced by pointer 214 (block 330). Electronic device 100 then determines whether another signal to review is received (block 340). The other signal can be a selection of skip back button 112, rewind button 113, or fast forward button 116. If another signal is not received ("no" output to block 340), then electronic device 100 then presents the portion of data stream 212 to the user (block 350), with the method terminating thereafter. If, however, another signal is received ("yes" output to block 340), then the method repeats beginning with block 320.

Embodiments may be implemented in software and can be adapted to run on different platforms and operating systems. In particular, functions implemented by telephonic recording system 102, for example, may be provided by an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium.

Thus, telephonic recording system 102 provides a method for reviewing a live conversation without interrupting the conversation. Additionally, telephonic recording system 102 enables a user to save and review the live conversation at any point during the live conversation or even at a later time.

What is claimed is:

1. A telephonic recording method, comprising: setting a first condition by an electronic device for recording a live conversation based on a dial tone being detected;
    setting a second condition by the electronic device for recording the live conversation based on a call being answered;
    based on a determination that the first condition is detected, automatically
    recording the live conversation with at least one participant to form a recorded live conversation; based on a determination that the first condition is not detected and that the second condition is detected, automatically recording the live conversation with at least one participant to form the recorded live conversation;
    presenting a portion of the recorded live conversation beginning at a segment selected by a user while continuing to record the live conversation; and
    storing the live conversation in a rolling buffer.

2. The method of claim 1, further comprising identifying the segment of the recorded live conversation selected by the user.

3. The method of claim 1, further comprising providing a pointer to reference a time in the recorded live conversation from which to begin presenting the portion of the recorded live conversation.

4. The method of claim 3, further comprising dynamically changing the time referenced by the pointer in response to the user selecting another segment of the recorded live conversation.

5. The method of claim 1, further comprising notifying the at least one participant in the live conversation that the live conversation is being recorded.

6. The method of claim 1, further comprising presenting a message which notifies the at least one participant in the live conversation that the live conversation is being recorded.

7. The method of claim 1, further comprising presenting a series of audible tones to notify the at least one participant in the live conversation that the live conversation is being recorded.

8. The method of claim 1, further comprising causing a live operator to notify the at least one participant in the live conversation that the live conversation is begin recorded.

9. An electronic device comprising: a first condition by the electronic device for recording a live conversation based on a dial tone being detected;
    a second condition by the electronic device for recording the live conversation based on a call being answered;
    a memory including a rolling buffer; wherein based on a determination that the first condition is detected, automatically storing at least a portion of the recorded live conversation, on the rolling buffer, with at least one participant wherein based on a determination that the first condition is not detected and that the second condition is detected, automatically storing at least the portion of the recorded live conversation, on the rolling buffer, with at least one participant; and a controller coupled to the memory, the controller presenting the portion of the recorded live conversation beginning at a segment selected by a user while continuing to record the live conversation.

10. The electronic device of claim 9, further comprising a pointer referencing a time in the recorded live conversation from which to begin presenting the portion of the recorded live conversation.

11. The electronic device of claim 10, wherein the time that the pointer references dynamically changes in response to the user selecting another segment of the recorded live conversation.

12. The electronic device of claim 9, further comprising a notification unit which notifies the at least one participant in the live conversation that the live conversation is being recorded.

13. A non-transitory computer-readable medium having stored thereon an instruction set to be executed, the instruction set, when executed by a processor, causes the processor to set a first condition by an electronic device for recording a live conversation based on a dial tone being detected;

set a second condition by the electronic device for recording the live conversation based on a call being answered;

based on a determination that the first condition is detected, automatically record the live conversation with at least one participant to form the recorded live conversation; based on a determination that the first condition is not detected and that the second condition is detected, automatically recording the live conversation with at least one participant to form the recorded live conversation;

present a portion of the recorded live conversation beginning at a segment selected by a user while continuing to record the live conversation; and store the live conversation in a rolling buffer.

14. The non-transitory computer-readable medium of claim 13, wherein the instruction set, when executed by the processor, causes the processor to identify the segment of the recorded live conversation selected by the user.

15. The non-transitory computer-readable medium of claim 13, wherein the instruction set, when executed by the processor, causes the processor to provide a pointer to reference a time in the recorded live conversation from which to begin presenting the portion of the recorded live conversation.

16. The non-transitory computer-readable medium of claim 15, wherein the instruction set, when executed by the processor, causes the processor to dynamically change the time referenced by the pointer in response to the user selecting another segment of the recorded live conversation.

17. The non-transitory computer-readable medium of claim 13, wherein the instruction set, when executed by the processor, causes the processor to notify the at least one participant in the live conversation that the live conversation is being recorded.

* * * * *

UNITED STATES PATENT AND TRADEMARK OFFICE
CERTIFICATE OF CORRECTION

| | |
|---|---|
| PATENT NO. | : 8,300,773 B2 |
| APPLICATION NO. | : 11/799379 |
| DATED | : October 30, 2012 |
| INVENTOR(S) | : Seth Pickett |

It is certified that error appears in the above-identified patent and that said Letters Patent is hereby corrected as shown below:

In column 6, line 56, in Claim 9, delete "device" and insert -- device, --, therefor.

In column 6, line 65, in Claim 9, delete "participant" and insert -- participant; --, therefor.

Signed and Sealed this
Ninth Day of April, 2013

Teresa Stanek Rea
*Acting Director of the United States Patent and Trademark Office*